United States Patent
Ganey et al.

(10) Patent No.: US 8,866,640 B2
(45) Date of Patent: Oct. 21, 2014

(54) PRIORITIZING USER INPUT DEVICES

(75) Inventors: Harriss C. N. Ganey, Cary, NC (US);
Aaron M. Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1178 days.

(21) Appl. No.: 12/341,582

(22) Filed: Dec. 22, 2008

(65) Prior Publication Data

US 2010/0156675 A1    Jun. 24, 2010

(51) Int. Cl.
*H03K 17/94* (2006.01)
*H03M 11/00* (2006.01)
*G06F 3/038* (2013.01)

(52) U.S. Cl.
CPC ........ *G06F 3/038* (2013.01); *G06F 2203/0381* (2013.01)
USPC .................... 341/20; 341/21; 341/22; 341/23

(58) Field of Classification Search
USPC ...................................................... 341/20–23
See application file for complete search history.

(56) References Cited

U.S. PATENT DOCUMENTS

| | | | | |
|---|---|---|---|---|
| 4,389,645 A * | 6/1983 | Wharton | .................... | 340/854.7 |
| 6,509,847 B1 * | 1/2003 | Anderson | ........................ | 341/34 |
| 6,643,721 B1 * | 11/2003 | Sun | ................................ | 710/62 |
| 2002/0130836 A1 * | 9/2002 | Ohmori et al. | ................ | 345/156 |
| 2004/0164848 A1 * | 8/2004 | Hwang et al. | ................ | 340/5.82 |
| 2004/0177101 A1 * | 9/2004 | Underwood | .................. | 708/131 |
| 2005/0223339 A1 * | 10/2005 | Lee | ................ | 715/825 |
| 2006/0012580 A1 * | 1/2006 | Perski et al. | .................. | 345/173 |
| 2006/0071915 A1 * | 4/2006 | Rehm | .......................... | 345/173 |
| 2007/0216662 A1 * | 9/2007 | Tanaka et al. | ................. | 345/173 |
| 2007/0260999 A1 * | 11/2007 | Amadio et al. | ............... | 715/804 |
| 2008/0143552 A1 * | 6/2008 | Mallison et al. | ........... | 340/853.1 |
| 2008/0216016 A1 * | 9/2008 | Oh | ................................ | 715/811 |
| 2009/0027354 A1 * | 1/2009 | Perski et al. | ................... | 345/173 |
| 2009/0153152 A1 * | 6/2009 | Maharyta et al. | ............. | 324/684 |

* cited by examiner

*Primary Examiner* — Hai Phan
*Assistant Examiner* — Amine Benlagsir
(74) *Attorney, Agent, or Firm* — Ference & Associates LLC

(57) ABSTRACT

An apparatus, method and program storage device are provided for preventing inadvertent inputs from a user while utilizing an electronic device having multiple user input devices. The instant invention broadly contemplates prioritizing an input device to the exclusion of other input devices available to the user based upon an intelligently designed prioritization scheme. The prioritization scheme disables the other input devices for a period of time to permit the user to provide inputs from a prioritized user input device.

18 Claims, 4 Drawing Sheets

PRIORITIZING USER INPUT DEVICES

FIELD OF THE INVENTION

The invention relates to preventing inadvertent inputs by a user when utilizing an electronic device having more than one user-input device. Specifically, the invention broadly contemplates methods and arrangements for intelligent filtering of inadvertent inputs by prioritizing user input devices.

BACKGROUND OF THE INVENTION

Some electronic devices (e.g. a laptop personal computer (PC)) have multiple input devices available to the user. The most common are keyboard and pointing devices (e.g. a mouse and/or a touch pad). Recently, the pointing device landscape has become more complex. In certain systems there are now multiple input pads responsive to touch, e.g. one for finger touch (e.g. a touch pad) and one for stylus touch (e.g. digitized/pen). Users encountering electronic devices with multiple inputs may inadvertently press or touch some input devices (e.g. the touch pad or the touch pad buttons while trying to use the stylus). The result is inadvertent or errant input (e.g. cursor activity appearing on the screen that does not match the user's expectations or intentions) that sometimes causes errors.

Conventional solutions to the above-described problem essentially fall into two categories. The first involves manually turning off one of the input devices (e.g. pressing Fn.+F8 keys). This is often an impractical solution for the user, as many times the user wishes to quickly switch back and forth between the input devices to complete a task. The second solution involves using a "palmcheck" filter that filters out potentially inadvertent contacts based on the size of the contact. The palmcheck filter ignores (i.e. filters out) inputs that are deemed too large to be caused by finger contact (e.g. a palm contact has a much larger area than a finger tip contact on a touch pad). While the palmcheck filter exists in some touchpad technologies, the filter is not sensitive enough to remove all of the inadvertent inputs. The filtering also does not filter for button clicks associated with an input device (e.g. the buttons associated with a touch pad).

Thus, a need has arisen to address the shortcomings of the conventional solutions for preventing inadvertent inputs encountered by users of multi-input electronic devices.

SUMMARY OF THE INVENTION

There is broadly contemplated herein, in accordance with at least one presently preferred embodiment of the present invention, methods, apparatuses and program storage devices that provide intelligent filtering of inadvertent and/or competing input signals from multiple input devices. The instant invention prioritizes the input devices to differentially affect their operability in order to intelligently match the context of use. As a non-limiting example, whenever a first input is detected from a stylus/digitizer and a simultaneous (second) input is detected from a touch pad or mechanical input device (e.g. a button associated with the touch pad or a keyboard key), the second input (e.g. from a touch pad or button, etc.) is likely input error. This situation is particularly true for certain users (e.g. left handed individuals) utilizing a particular machine configuration (e.g. a digitizer located to the right side of a touch pad with buttons). If a predetermined pattern of inputs is detected, the invention is capable of, among other things, communicating with the user (e.g. to determine if the user is known to have such issues (left handedness)) and turning off an input device (e.g. a touch pad/buttons); or automatically ignoring an input as error.

In summary, one aspect of the invention provides an apparatus comprising: a pen-enabled input device; at least one other input device located adjacent to the pen-enabled input device; a processor; and a storage device tangibly embodying a program of instructions executable by the processor, the instructions comprising: instructions that, in response to detecting inputs from the pen-enabled input device and the at least one other input device, implement a prioritization scheme to affect an operation of the at least one other input device.

Another aspect of the invention provides a computer implemented method comprising: detecting inputs from a pen-enabled input device and at least one other input device located adjacent to the pen-enabled input device; and in response to the detecting the inputs, implementing a prioritization scheme to affect an operation of the at least one other input device.

Another aspect of the invention provides A program storage device readable by machine, tangibly embodying a program of instructions executable by a processor of the machine, the program of instructions comprising: instructions that, in response to detecting inputs from a pen-enabled input device and at least one other input device located adjacent to the pen-enabled input device, implement a prioritization scheme to affect an operation of the at least one other input device.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
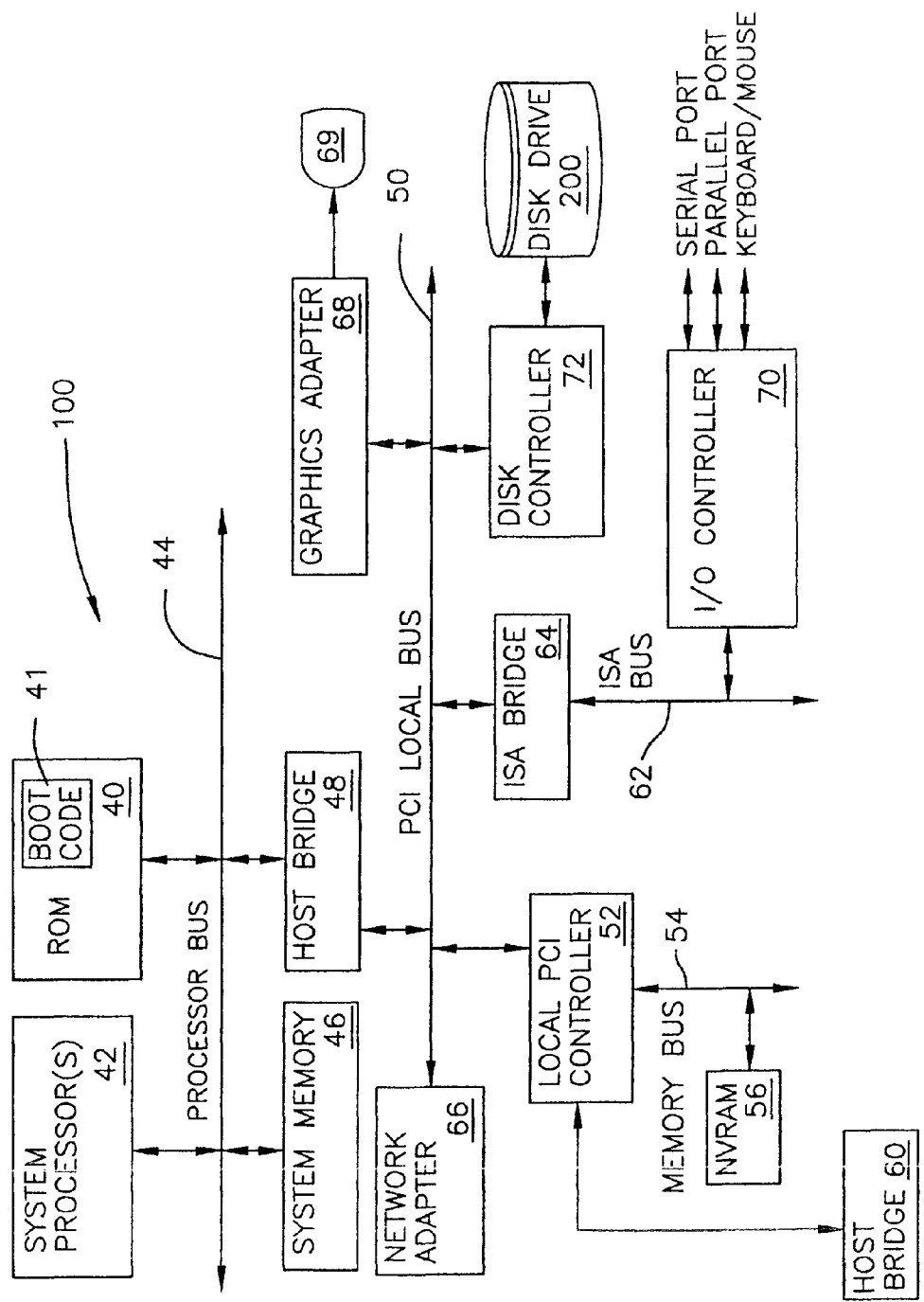
FIG. 1 provides a block diagram of an electronic device.

It will be readily understood by those having ordinary skill in the art that the components of the present invention, as generally described and illustrated in the figures herein, may be arranged and designed in a wide variety of different configurations. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of hardware, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected embodiments of devices, systems, and processes that are consistent with the invention as claimed herein. The following description begins with a general overview of the instant invention and then refers to the figures to provide more details.

As noted above, the conventional palmcheck solution provides that if the contact detected on the touchpad is larger than the average size (e.g. measured in $mm^2$) of the expected contact (e.g. when a user is using a fingertip), then the palmcheck filter filters out that input as error. However, it has become apparent that the palmcheck filter type solutions are not sensitive enough to avoid problems with errant inputs from the user.

Also noted above, the conventional solution of toggling between user inputs (e.g. through use of a control/function key and a display window and menu, utilizing BIOS, with options to disable certain input devices) is impractical because the user may want to use the various inputs in rapid succession. Thus, the time consuming manual inputs currently required for toggling between user input modes are prohibitive.

Accordingly, one embodiment of the instant invention provides that if one type of input is detected, another type of input (e.g. from another input device) detected simultaneously (or nearly so, e.g. within 0.5 seconds) is likely to be an errant input. Thus, the instant invention ascertains an input pattern and intelligently decides which of the inputs is likely errant and filters that errant input out. Broadly, the instant invention intelligently prioritizes user-input devices for the particular electronic device that is being utilized. It should be noted that input devices come in many different forms, including relative (e.g. touch pads) and absolute (e.g. digitizers).

An embodiment of the instant invention is described herein with respect to a specific, non-limiting example where a laptop PC has a digitizer (for accepting pen/stylus inputs) located adjacent to a touch pad having buttons, with both of these user inputs being located below a keyboard. However, it should be understood that this example is non-limiting and that the instant invention can be advantageously implemented in electronic devices having more than one user input, especially devices having user input devices positioned such that errant inputs are likely. For example, the user inputs on a mobile/cellular phone having a touch screen and keys (e.g. keyboard or similar input device) could be prioritized according to ergonomic and/or user preference considerations to avoid errant user inputs.

According to an embodiment of the instant invention, if a stylus/pen type input is detected by a digitizer, then other simultaneously occurring inputs, specifically inputs coming from a touchpad and/or buttons located adjacent to the digitizer (e.g. to the left of the digitizer), are deemed errant and deactivated (rendered ineffective at performing the input indicated). These deactivated input devices are reactivated (have their functionalities restored) when the stylus/pen is not detected by the digitizer for a predetermined time (e.g. 0.5 seconds). This process can occur automatically or be modified to achieve the user-friendliest arrangement. It will be readily understood by those having ordinary skill in the art that the predetermined time(s) can be modulated according to user preferences, the type of device the invention is implement upon, etc.

It should be noted that digitizers for stylus/pen input are currently available and a presently preferred 80×125 mm digitizer may be obtained from WACOM (www.wacom.com), such as the digitizer presently used in the ThinkPad® W series of laptop PCs (e.g. W700 laptop PC). However, it should be noted again that although the description discusses touch pad and digitizer inputs, other user interface inputs could also be prioritized and filtered according to the instant invention.

Accordingly, as the digitizer and the stylus come into close proximity (e.g. 1 cm) the digitizer senses input from the stylus (e.g. through infrared (IR) detection). Once the digitizer detects the stylus, the user is able to utilize the stylus/pen to accomplish functions (e.g. move a cursor or like indicator on a display medium of the electronic device). Thus, the user, by placing the stylus in proximity of the digitizer, is indicating a preference for using the stylus to provide inputs into the electronic device. The invention therefore utilizes the detection of the stylus to prioritize the stylus and digitizer as the priority input device and to affect the operability (e.g. deactivate) of other input devices (e.g. the touch pad, touch pad buttons, etc.).

According to an embodiment of the instant invention, additional inputs can be utilized to prioritize and deactivate user-input devices. For example, in a tablet type PC, if a configuration associated with the PC being utilized as a tablet is detected, the PC could default to a prioritization scheme. The prioritization scheme could include, for example, prioritizing the stylus for tablet input when the device is appropriately configured and deactivating other user inputs (e.g. buttons located proximately to the tablet input) for a predetermined time (e.g. on the order of seconds, preferably 0.5 seconds). If after a predetermined time has elapsed (e.g. 0.5 seconds), a stylus input is not detected, the other user inputs devices (e.g. buttons, touch pad, etc.) are reactivated.

According to one embodiment of the instant invention, additional inputs could also be utilized in a like manner. For example, a stylus cavity or holder provided with a detector therein could detect the removal of the stylus and utilize this detection to implement a prioritization scheme. As an example, upon such detection, the stylus input is set as the preferred/prioritized input, and deactivation of other user input devices for a predetermined time is employed.

The user may wish to have a greater degree of control over the system for prioritizing input devices. Thus, according to one embodiment of the instant invention, the electronic device provides a communication to the user (e.g. a pop-up window) in order to provide the user with increased flexibility in deciding which input device to utilize. Therefore, a user preferring a higher degree of control is provided additional communication capabilities with the electronic device such that the automated prioritization and deactivation/delay of user input devices is augmented. For example, the device could provide a popup window indicating: "I've detected the stylus and I'm turning off the touchpad for you. Ok?" The user could then select an option and provide the appropriate input as feedback (either directing the system to proceed with the proposed action or indicating some other preference). This communication (e.g. pop-up window) could be utilized once or could be repeated, as necessary. As another example, the first time conflicting inputs are detected, the popup window could ask "Are you left-handed?" This may be useful because it could be that there is a right-handed user that is trying to use the digitizer and the touchpad concurrently; or alternatively, there could be a true errant input at the touch pad by a left handed user (again, left handed users are particularly susceptible to errant inputs when the digitizer is placed to the right of the touch pad).

According to one embodiment of the invention, pop-up windows (or similar communications) could be included as part of the initial set up options for the electronic device. This way a user could enter preferred settings (e.g. for a left-handed individual, etc.) or customized settings could be employed when an alternative user logs on to the device. Additionally, preferred settings could be saved by users on the device (e.g. as accessed through the control panel application of the device). The system would then consult these saved preferences prior to taking automated actions to effect a prioritization scheme.

According to one embodiment of the instant invention, the prioritization scheme(s) for user(s) can be configured in a number of additional ways. For example, the original equipment manufacturer (OEM) could have the electronic device configured for a particular prioritization scheme. This prioritization scheme could be changed or altered by the user (e.g. a user could select from left or right handed prioritization schemes provided by the OEM, or could customize a prioritization scheme entered during set up of the electronic device).

According to one embodiment of the instant invention, more conservative approaches are contemplated. For example, rather than just the detection of the stylus as the criteria for turning off the touchpad, buttons, etc., actual movement of the stylus on/over the surface of the digitizer for a period of time may be the criteria for executing a prioritization scheme.

Additionally, a user's input history could be stored and consulted by the electronic device to ascertain a particular scenario is taking place. For example, when multiple user inputs are detected from more than one user-input device simultaneously or in rapid succession, the electronic device tracks such a pattern. This pattern of inputs is detected and identified as anomalous, with the errant or anomalous input(s) being filtered out. For example, if a user repeatedly provides conflicting inputs from a touch pad area while utilizing the pen-enabled digitizer, the device could deactivate the particular area of the touch pad that is providing the errant input (e.g. disregard inputs from that area). Thus, the user history is consulted and the device automatically filters out the anomalous input(s) from that area of the touch pad while the digitizer is being utilized (i.e. the device intelligently predicts that the user is prone to providing errant inputs from a particular input device or area thereof while using the electronic device in a certain way).

In accordance with at least one embodiment of the invention, the core point of utilizing the user history is that the electronic device can log simultaneous inputs and associated actions that follow the simultaneous inputs and then adjust: 1) the strictness of the filtering; or 2) enable/disable a state of an input device. Per other aspects of the invention, the pen input may be prioritized above other inputs when it is detected. If no editing actions (e.g. delete or pen erase) are detected after the simultaneous inputs, the prioritization is deemed well-mapped to the intended outcome. When situations like this occur in the future, the confidence of the filtering/prioritization may increase to a point where the electronic device simply disables competing inputs. This may become extreme enough that an input device is fully disabled if no intended input is ever detected from it. For example, if the TrackPoint® pointing device is always used for pointing, there is never any intended input from the touch pad. Therefore, the electronic device can safely disable the touch pad whenever the pen is detected. That is, due to the TrackPoint® pointing device being the dominant pointing device, it is not likely that the touch pad input is intended (i.e. the touch pad is not likely to be used to point).

Anomalous or errant user inputs may occur temporally or spatially. Temporal anomalous inputs include for example repeated use of one user input device with an input form another user input device intermingled therein. Spatially anomalous user inputs include for example a touch pad or button input that the user repeatedly provides while using the digitizer. Other anomalous inputs would correspond to scenarios where the pen/stylus is inadvertently detected but not intentionally used.

Additional complex approaches are contemplated by embodiments of the instant invention. For example, the instant invention can take into account what applications, etc., the user is currently utilizing to intelligently filter out errant inputs. Thus for example, if a drawing program application is being utilized, e.g. Adobe Illustrator® drawing program, the default setting is to deactivate the touch pad and prioritize the digitizer. According to the instant invention, the user is enabled to select from different predefined settings and modify or customize those settings, as necessary (e.g. select a particular setting for use in conjunction to a particular mode of operation or for use with a particular application).

According to one embodiment of the instant invention, the deactivated user input device is reactivated after a predetermined time. For example, if the electronic device detects a pen/stylus input (e.g. located near the digitizer) and for some reason there is no further movement of the pen, e.g. for 0.5 seconds, the electronic device reactivates the touchpad. This would correspond to a scenario where the user has laid the pen upon the digitizer but does not intend to use the digitizer, at least for the moment.

Referring now to the figures, presently preferred embodiments of the instant invention will be described with reference to accompanying figures and the scope of the invention will be pointed out in the appending claims.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the ThinkStation®, which are sold by Lenovo (US) Inc. of Morrisville, N.C.; however, as will become apparent from the following description, the present invention is applicable to operation by any data processing system.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
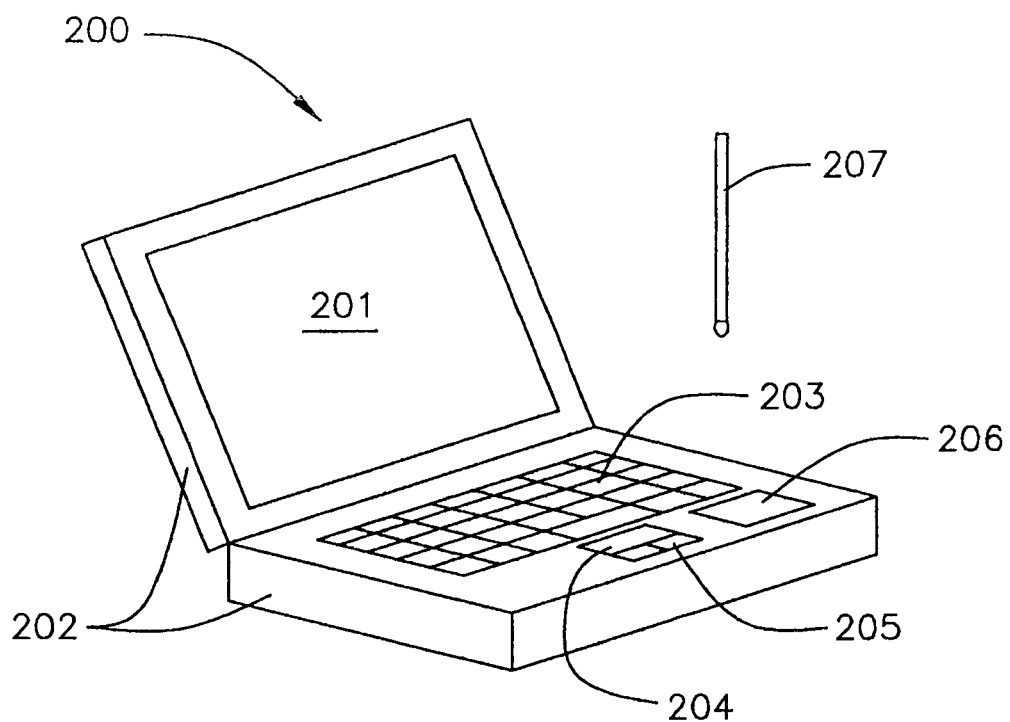
FIG. 2 provides high level view of an electronic device having multiple user input devices.

FIG. 2 shows a device having multiple user-input devices according to one embodiment of the invention. An electronic device (200) is shown having a display medium (201) and a housing (202). The electronic device (200) may be a device as outlined as in FIG. 1 above; however, those having ordinary skill in the art will recognize that other suitable electronic devices may contain multiple user inputs and be utilized with the instant invention. The electronic device (200) contains components for executing the functionalities of the device, such as those outlined with respect to FIG. 1 above. The electronic device has multiple user input devices. Among these user input devices are a keyboard (203), a touch pad (204), touch pad buttons (205) and a digitizer (206) that can be utilized in conjunction with a stylus/pen (207). The instant invention executes prioritization schemes to prioritize certain user input devices, as described herein.

Figure 3:
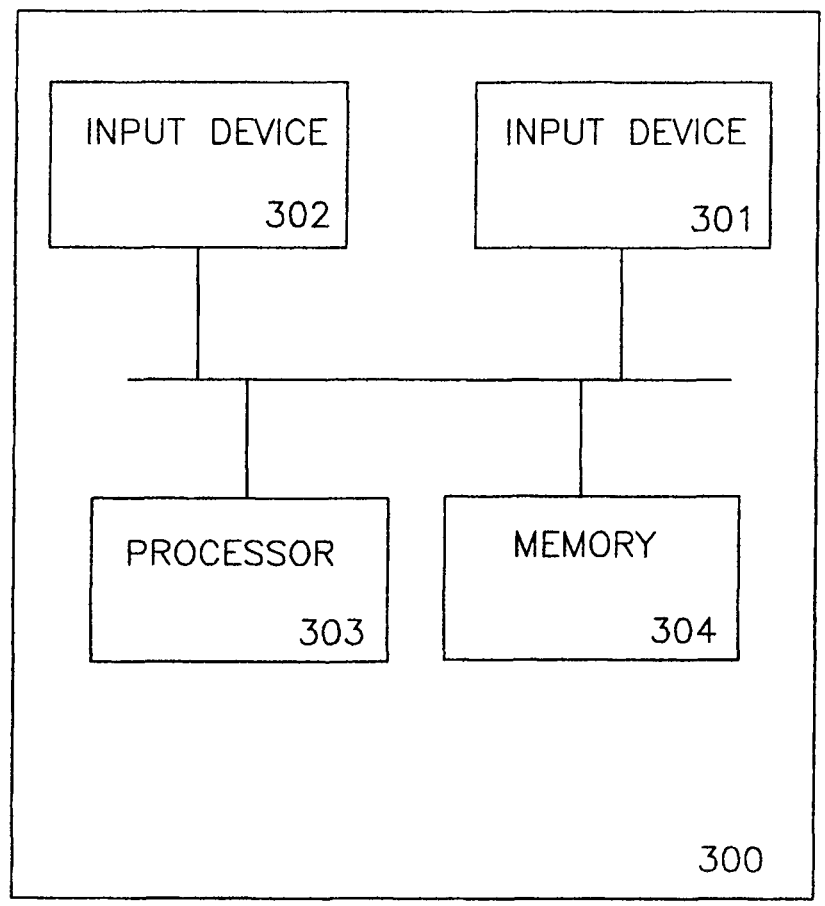
FIG. 3 provides a block diagram of an electronic device for prioritizing user inputs.

FIG. 3 depicts a block diagram of an electronic device (300) according to at least one embodiment of the instant invention. The electronic device may be one such as that depicted in FIGS. 1-2, with certain components identified in FIG. 3 for clarity. In FIG. 3 the electronic device (300) comprises at least two input devices (301) (302), at least one processor (303) and a memory (304). The input devices (301) (302) are preferably a pen enabled input device (301) located adjacent to a touch pad input device having buttons (302), as shown in FIG. 2. The input devices (301) (302) provide user inputs to the electronic device (300). The memory (304) contains a program of instructions executable by the processor (303) to ascertain the pattern of inputs from the input devices (301) (302) and implement an appropriate prioritization scheme for the input devices (e.g. deactivate the touch pad for a predetermined time, e.g. 0.5 seconds, upon detecting pen-enabled digitizer input). The electronic device (300) may utilize user preferences and/or device defaults set by the OEM stored in memory, currently running applications, user history, etc. in determining the appropriate prioritization scheme, as herein described.

Figure 4:
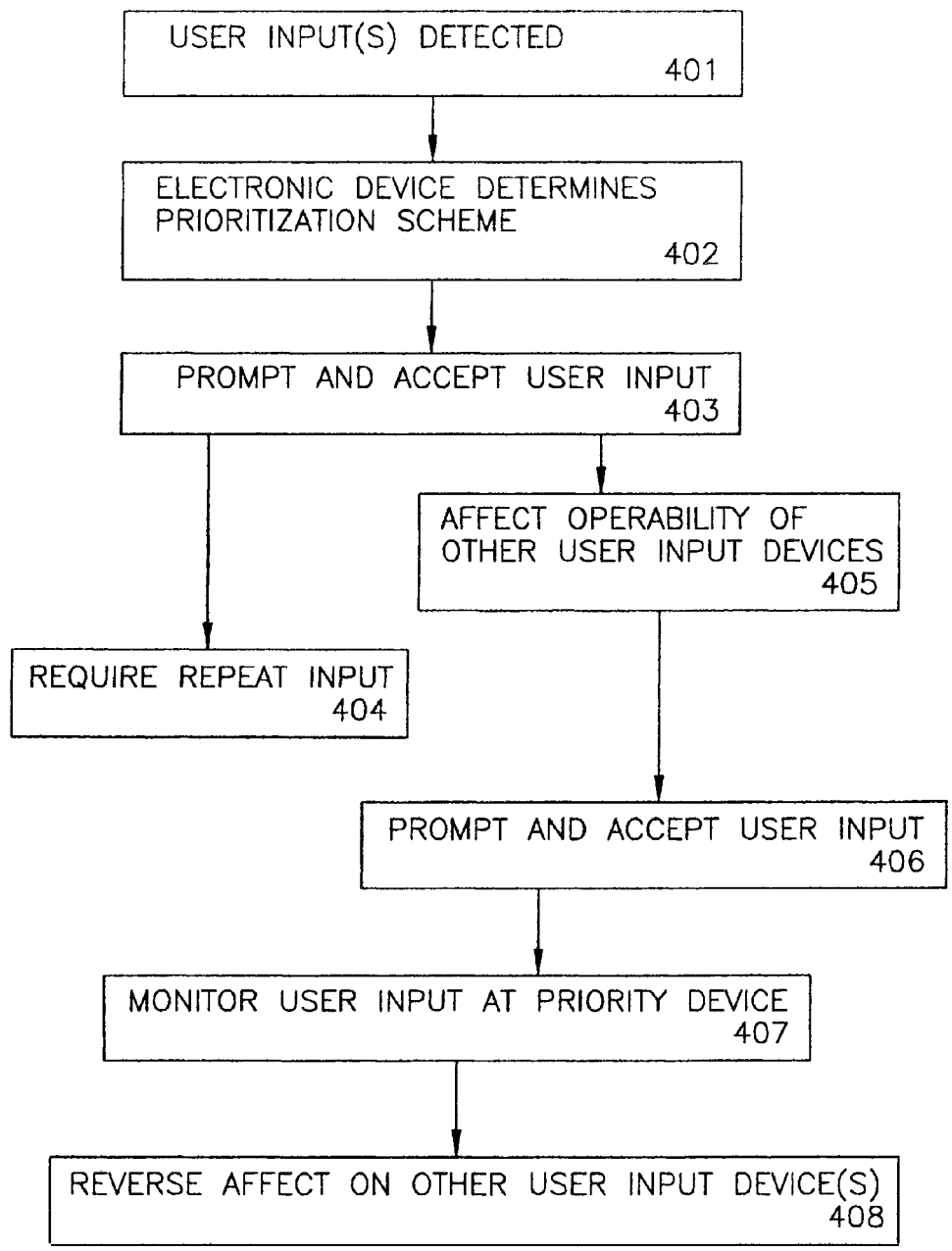
FIG. 4 is a flow chart for a prioritization scheme.

FIG. 4 is a flow chart for a prioritization scheme according to one embodiment of the instant invention. The electronic device (300) detects user input(s) at (401) into user input devices (301) (302) that may represent anomalous or errant inputs (e.g. simultaneous inputs from the touch pad and the pen-enabled digitizer). At (402), the electronic device (300) takes into account any stored prioritization scheme(s) (e.g. stored user preferences, device defaults, user history, currently running applications, etc.) in determining the appropriate prioritization scheme for the given input pattern (to set a user input device as the priority user input device and filter the inputs). The electronic device may optionally prompt the user (e.g. via pop-up window) for an input/communication indicating that errant inputs have been detected and the proposed action (403) and await a response from the user thereto (i.e. prompt the user for resolution of the competing input signals). If the user intended the detected inputs (i.e. they were not error), then the device may require the user to repeat the input (404). Depending upon the scenario, the electronic device (300) may automatically set a priority-input device and affect the operability of the other user-input devices (e.g. deactivate them) at (405) so as to filter out inputs provided through those input devices. It should be noted that a delay, if any, between setting the priority device and affecting the operability of the other input device(s) is preferably short (e.g. essentially non-existent). It should also be noted that the setting a priority device step could simply comprise affecting the operability of the other input device(s), i.e. the input device that has not been affected (e.g. deactivated) becomes the priority device. If the electronic device (300) automatically sets a priority device, the user may be prompted to confirm that the filtering action mapped to the intended outcome at (406). At (407) the electronic device (300) continues to monitor user input(s) from the priority user input device. At (408), upon not detecting a user input from the priority user input device, the electronic device (300) reverses the affect on the operability of the other user input devices (e.g. reactivates the other user-input devices).

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the instant invention may take the form of an entirely hardware embodiment or an embodiment containing both hardware and software elements. An embodiment that is implemented in software may include, but is not limited to, firmware, resident software, microcode, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

Elements of the instant invention may be implemented on at least one computer running suitable software programs. These may also be implemented on at least one Integrated Circuit or part of at least one Integrated Circuit. Thus, it is to be understood that the invention may be implemented in hardware, software, or a combination of both. Thus, computer readable programs may in combination with a computer system perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   a pen-enabled input device;
   at least one other non-pen enabled input device located adjacent to the pen-enabled input device;
   a processor; and
   a storage device tangibly embodying a program of instructions executable by the processor, the instructions comprising:
   instructions that, in response to detecting inputs from the pen-enabled input device and the at least one other non-pen enabled input device, implement a prioritization scheme to disable an operation of the at least one other non-pen enabled input device;
   wherein the prioritization scheme automatically disables the at least one other non-pen enabled input device beginning in response to simultaneous utilization of the pen-enabled input device and the at least one other non-pen enabled input device and continues for a period of time after the simultaneous utilization; and
   instructions that adjust the prioritization scheme based on a user history.

2. The apparatus according to claim 1, wherein the pen-enabled input device and the at least one other non-pen enabled input device are human input devices are located horizontally adjacent to one another in a surface of the apparatus.

3. The apparatus according to claim 2, wherein the pen-enabled input device is located on a right side of the at least one other non-pen enabled input device in the surface of the apparatus.

4. The apparatus according to claim 3, wherein the at least one other non-pen enabled input device comprises a mechanical input device.

5. The apparatus according to claim 3, wherein the prioritization scheme automatically disables the mechanical input device, and wherein the mechanical input device comprises a touch pad button.

6. The apparatus according to claim 1, wherein the instructions further comprise:
   instructions that prompt a user for input prior to implementing the prioritization scheme.

7. The apparatus according to claim 1, wherein the instructions further comprise:
   instructions that ascertain if a user defined prioritization scheme has been stored in a memory; and wherein, if a user defined prioritization scheme has been stored in a memory, the user defined prioritization scheme is implemented.

8. A computer implemented method comprising:
   detecting inputs from a pen-enabled input device and at least one other non-pen enabled input device located adjacent to the pen-enabled input device;
   in response to the detecting the inputs, implementing a prioritization scheme to disable an operation of the at least one other non-pen enabled input device;
   wherein the prioritization scheme automatically disables the at least one other non-pen enabled input device beginning in response to simultaneous utilization of the pen-enabled input device and the at least one other non-pen enabled input device and continues for a period of time after the simultaneous utilization; and
   adjusting the prioritization scheme based on a user history.

9. The method according to claim 8, wherein the pen-enabled input device and the at least one other non-pen enabled input device are human input devices are located horizontally adjacent to one another in a surface of the apparatus.

10. The method according to claim 8, wherein the pen-enabled input device is an absolute input device and wherein the at least one other non-pen enabled input device is a relative input device.

11. The method according to claim 10, wherein the at least one other non-pen enabled input device comprises a mechanical input device.

12. The method according to claim 11, wherein the prioritization scheme automatically disables the mechanical input device, and wherein the mechanical input device comprises a touch pad button.

13. The method according to claim 8, further comprising:
    prompting a user for input prior to implementing the prioritization scheme.

14. The method according to claim 8, further comprising:
    ascertaining if a user defined prioritization scheme has been stored in a memory;
    wherein, if a user defined prioritization scheme has been stored in a memory, the user defined prioritization scheme is implemented.

15. The method according to claim 8, wherein the period of time does not exceed five seconds.

16. A program storage device readable by machine, tangibly embodying a program of instructions executable by a processor of the machine, the program of instructions comprising:
    instructions that, in response to detecting inputs from a pen-enabled input device and at least one other non-pen enabled input device located adjacent to the pen-enabled input device, implement a prioritization scheme to disable an operation of the at least one other non-pen enabled input device;

wherein the prioritization scheme automatically disables the at least one other non-pen enabled input device beginning in response to simultaneous utilization of the pen-enabled input device and the at least one other non-pen enabled input device and continues for a period of time after the simultaneous utilization; and instructions that adjust the prioritization scheme based on a user history.

17. The apparatus of claim 1, wherein the user history includes a history of editing errant inputs;

wherein the history of editing errant inputs adjusts the prioritization scheme.

18. The apparatus of claim 1, wherein the prioritization scheme is further adjusted based on at least one application active during user input.

\* \* \* \* \*